(No Model.) 8 Sheets—Sheet 1.
I. N. LEWIS.
RANGE AND POSITION FINDER.

No. 447,335. Patented Mar. 3, 1891.

Fig. 1.

WITNESSES:
H. F. Parker
Chas. Hanimann

INVENTOR
Isaac N. Lewis

By Chas. W. Forbes ATTY.

(No Model.) 8 Sheets—Sheet 2.

I. N. LEWIS.
RANGE AND POSITION FINDER.

No. 447,335. Patented Mar. 3, 1891.

WITNESSES:
H. F. Parker
Chas. Hanimann

INVENTOR
Isaac N. Lewis

By Chas. W. Cooke ATTY.

(No Model.) 8 Sheets—Sheet 7.

I. N. LEWIS.
RANGE AND POSITION FINDER.

No. 447,335. Patented Mar. 3, 1891.

WITNESSES:

INVENTOR

Isaac N. Lewis

UNITED STATES PATENT OFFICE.

ISAAC N. LEWIS, OF FORT LEAVENWORTH, KANSAS.

RANGE AND POSITION FINDER.

SPECIFICATION forming part of Letters Patent No. 447,335, dated March 3, 1891.

Application filed April 18, 1890. Serial No. 348,443. (No model.)

*To all whom it may concern:*

Be it known that I, ISAAC N. LEWIS, a citizen of the United States, residing at Fort Leavenworth, in the county of Leavenworth and State of Kansas, have invented certain new and useful Improvements in Range and Position Finding Instruments, of which the following is a specification.

My invention relates to depression range-finders, the plane of triangulation being vertical. The base-line is represented by the altitude of the instrument above sea-level or other horizontal element of triangulation along which the range is to be measured, forming a right angle therewith. The triangle formed by these two lines and the line of sight of the telescope is therefore always a right-angled triangle. The depression of the telescope when directed upon a distant object gives a measure of the other two angles of the triangle, from which the required value is readily obtainable.

The object of my invention is to provide an instrument having quick and accurate means of adjustment to meet the varying natural conditions incident to the depression method, such as the altitude of the instrument, the variation of tide, and the curvature of the earth's surface, and to give the correct indications mechanically and automatically to the observer without his computation.

To these ends my invention consists, first, of an improved indicator operated in conjunction with a range and position finding telescope for graphically indicating or recording upon a plane table both the range and position of a distant object, also for the production of original maps of harbors, and adapted, furthermore, to explode local submarine mines automatically when approached by a hostile vessel; second, in certain improved mechanism for operating such indicator simultaneously with the angular motion of a depression-telescope; third, in mechanism for adjusting the relative movement of the indicator to the depression angular motion of the telescope according to the variable altitude of the instrument above the sea-level or other horizontal element of the triangulation; fourth, in mechanism for automatically modifying such relative movement in varying ratio to the range for different altitudes of the instrument in order to make the necessary correction of indication due to the earth's curvature.

Having reference to the accompanying drawings, in which similar reference-numerals indicate corresponding parts throughout, Figs. 9 to 15, inclusive, are detail views all drawn on the same scale as Fig. 8, namely.

I will describe the several features of my invention in the order above set forth.

First, the indicator for graphically indicating or recording the range and position and its relation of movement to the horizontal movement of the telescope.

Referring to Figs. 2 to 6, inclusive, 11 is a stationary plane table fixed in a level position upon suitable permanent supports, such as 12 12.

13 is a vertical pivot upon which the remaining parts of the instrument turn in a horizontal plane of rotation.

14 is a segmental rack on the movable frame of the instrument, with which rack a tangent-screw 15 engages, so as to effect the said horizontal rotation at will.

The instrument may be constructed to sweep the entire horizon, if required, the plane table 11 and rack 14 being in that case extended to form a complete circle. The plate 16, bearing the rack 14, and the scale-arm 18, secured rigidly to the plate, form the base-frame of the movable part of the instrument, and the outer extremity of the scale-arm of the base-frame is supported upon a roller 7, traveling upon the circumferential track 19, concentric with the pivot 13.

23 is a terrestrial telescope having depression angular motion in a vertical plane coinciding with or parallel to the scale-line of the arm 18. The telescope is fastened to the frame 24, which has its angular movement about the horizontal axis 25 in the supports 26, secured to the scale-arm 18.

27 represents a spirit-level attached to the telescope-frame 24 for testing the accuracy of the instrument when brought to bear upon an object at a given distance—say of a minimum range of five hundred yards.

33 is a plate overhanging the plate 16, and to these upper and lower plates the parallel bars 18 and 17, composing the scale-arm, are respectively secured.

Figure 4:
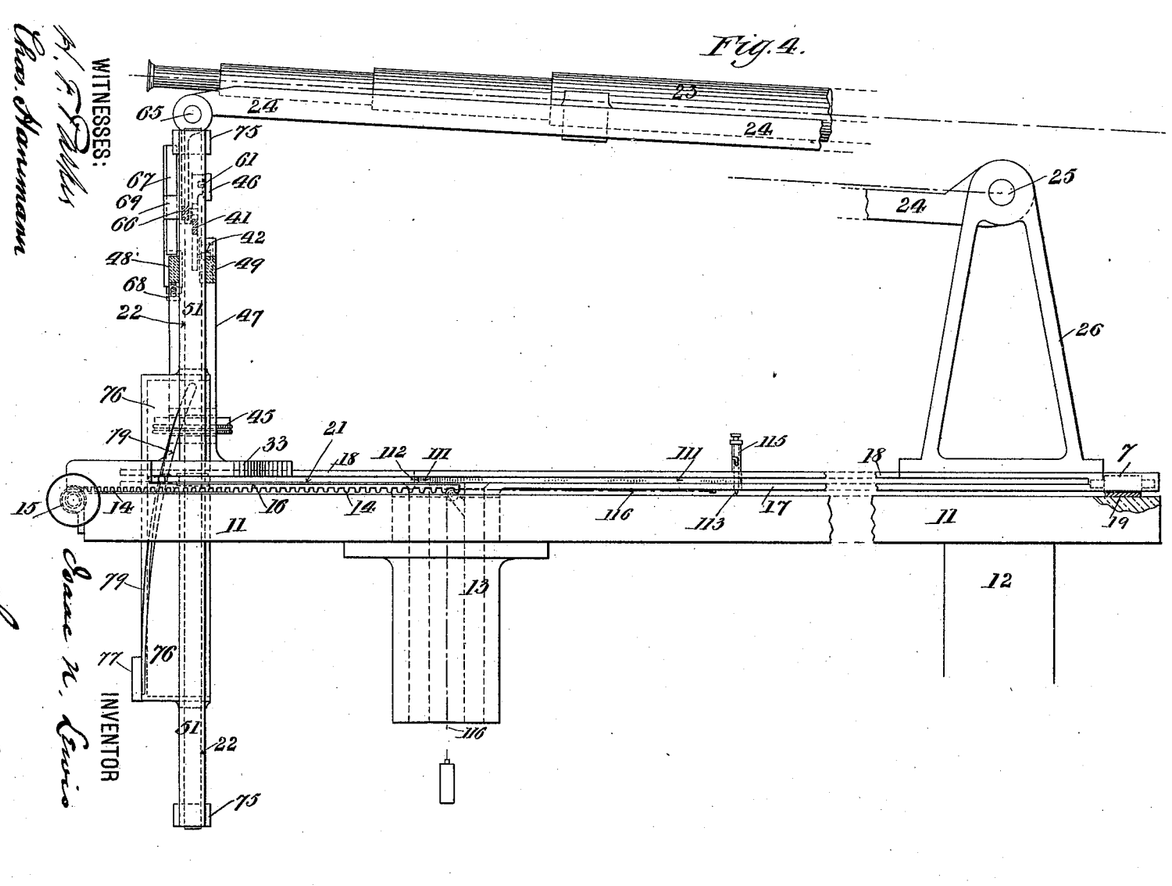
Fig. 4 is a side elevation of the instrument on an enlarged scale.
Figure 5:
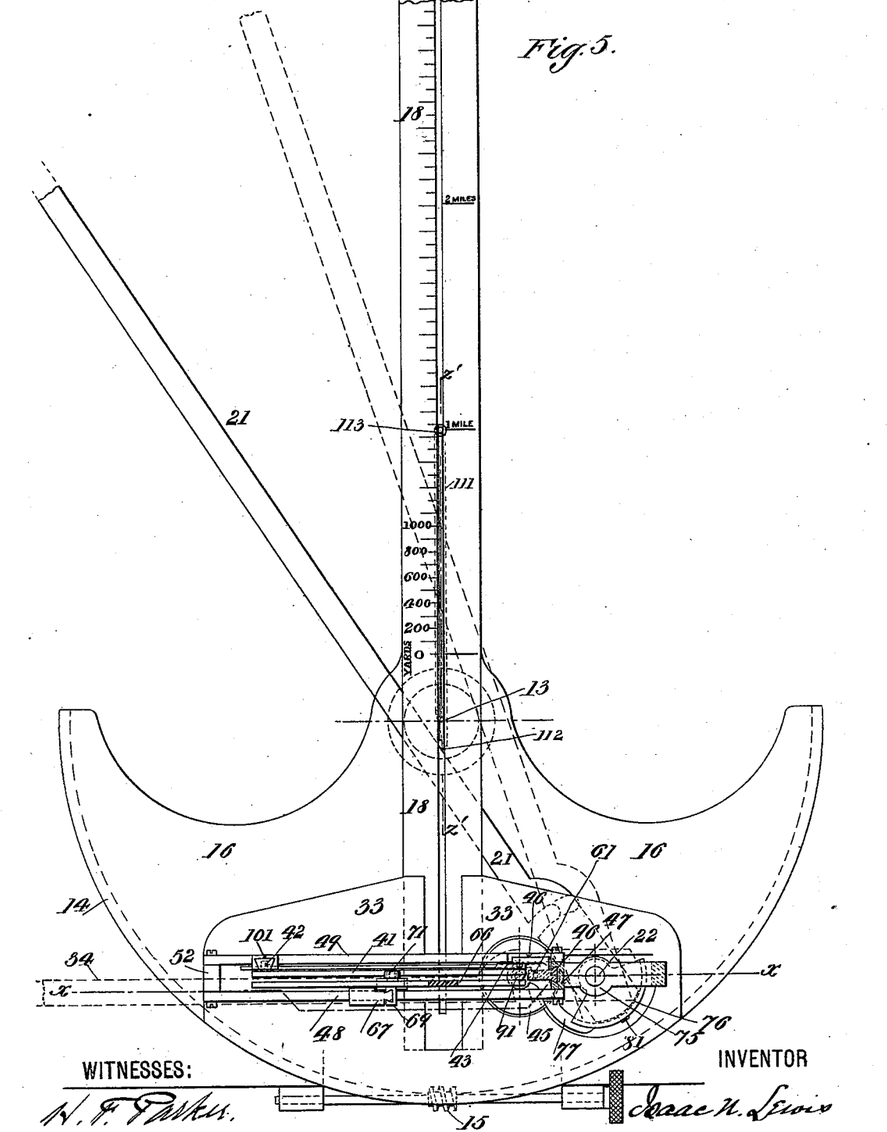
Fig. 5, a plan view of the indicating mechanism on the same scale as Fig. 4, the telescope and its frame being removed.
Figure 6:
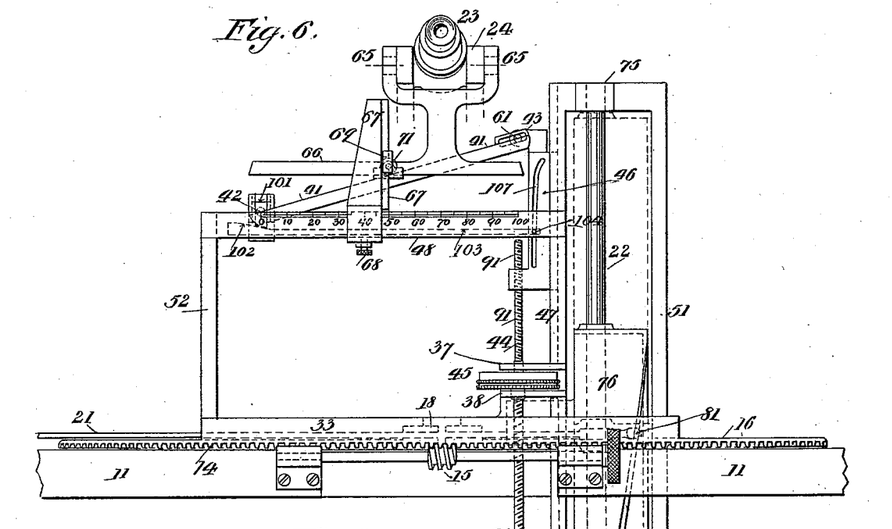
Fig. 6, an end elevation of the instrument on the same scale as Figs. 4 and 5.

21 is the index-arm pivoted at 22 in the movable frame aside from the scale-line of the rectilinear scale-arm 18, so as to intersect the same at variable distances from the axis 13 to indicate the range. As seen in Fig. 4 and also in Fig. 8, the index-arm is free to swing under the plate 33 between it and the plate 16 to the right-angular position. (Indicated by dotted lines at 34, Fig. 5.)

Figure 3:
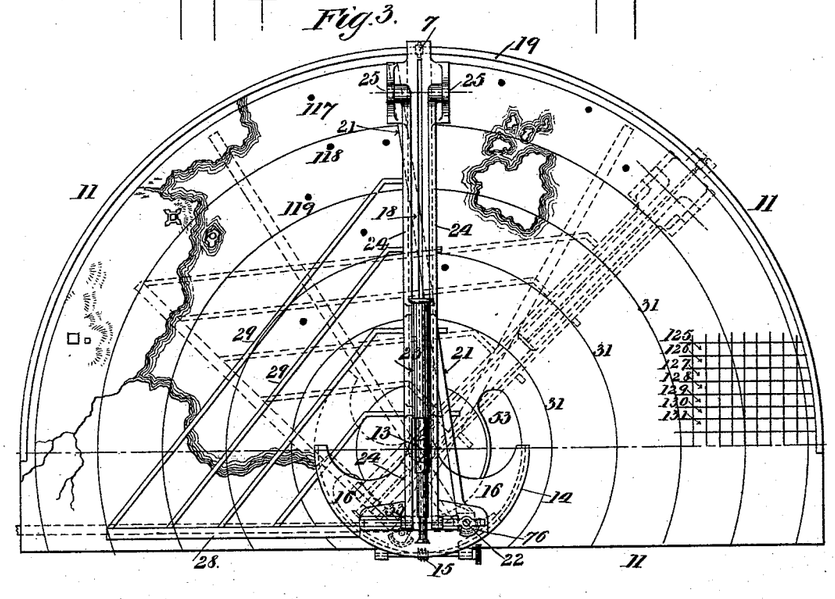

28, Fig. 3, is a right-angular extension of the movable base-frame, and 29 29 represent supporting-bars, upon which the index-arm 21 is sustained in its various movements from the aforesaid right-angular position toward and from the scale-arm 18.

The plate 33 bears the frame of the telescope-elevating apparatus and index-moving apparatus, composed of the vertical frame-bars 47, 51, and 52, and the horizontal scale-bar 48 and its parallel frame-bar 49. A curved slot 53, Fig. 3, is provided in the plane table to give clearance to the depending part of the frame 47 51 when the instrument is horizontally rotated.

The range-circles 31 represent miles, the geographical position of the instrument being represented by the axis 13 upon the plane table. The capacity of the instrument is extended to six miles, as represented, this being the practical limitation for an elevation of twenty-four feet, the average elevation at which the instrument is intended to be used. The circular range-scale 31 may of course be graduated by intermediate circles, so that the range indicated by the intersection of the index-arm 21 with the scale-arm 18 may be read at any part of the table, while the position of the distant object is at the same time indicated by the angle of the arm 18 with any given radial line of the plane-table.

The plane table bears a map of the harbor, such as indicated in Fig. 3, or other geographical surroundings within the range and horizon sweep of the instrument, and upon the map the position of a distant object may be graphically indicated and noted, according to the radial direction of the scale-arm 18 and the point of intersection of the index-arm 21 thereon.

In lieu of reading the indications from the point of intersection of the index-arm with the index-scale, the same may be read at a point in advance of such intersection, as provided by the device illustrated in Figs. 4, 5, 13, 14, and 15. This consists of a pencil slide 111, which moves freely between the bars of the scale-arm, and has a knife-edge 112 (or a small roller may be substituted) at the end bearing on the index-arm 21, so as to give a definite bearing-point, and at the opposite end of the slide there is a pencil 113, which is maintained in contact with the map with moderate pressure by a weak spring 114 within the pencil-tube 115. The indications are read from the scale opposite the axis of the pencil, the position of the parts in Fig. 5 indicating one mile. The pencil-slide is retained against the edge of the index-arm when the latter is retracted by a small weight connected thereto by a cord 116, passing through the axis of the pivot 13 over a pulley, as illustrated. A long narrow spiral spring may be substituted for the cord and weight, the spring being placed between the bars 17 and 18, between the pencil-slide and the outer extremity of the scale-slot.

Figure 13:
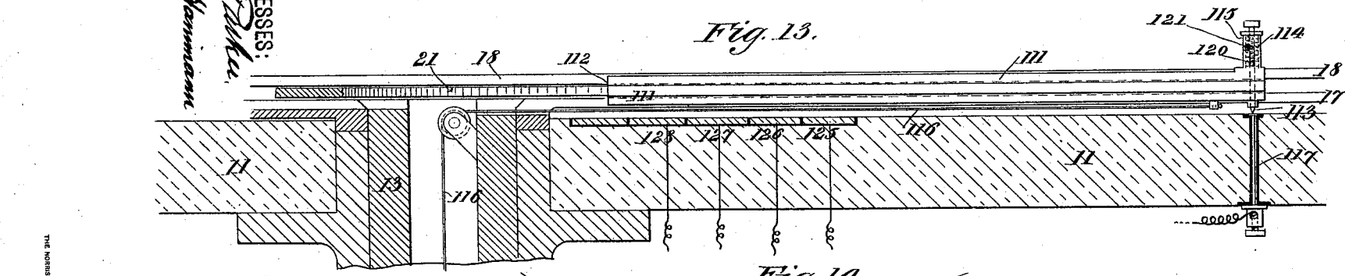
Fig. 13, a longitudinal section through the pivot of the instrument, from $z'$ to $z'$, Fig. 5, showing the pencil-slide of the indicating mechanism.
Figure 14:
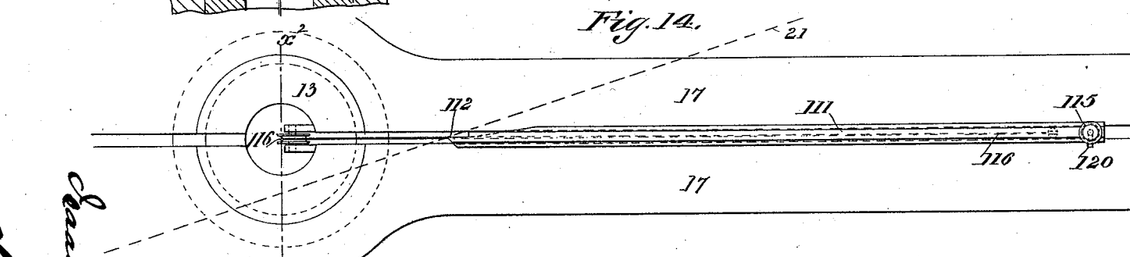
Fig. 14, a plan view of Fig. 13, and Fig. 15 a cross-section $x^2$ $x^2$ of Fig. 14.
Figure 15:
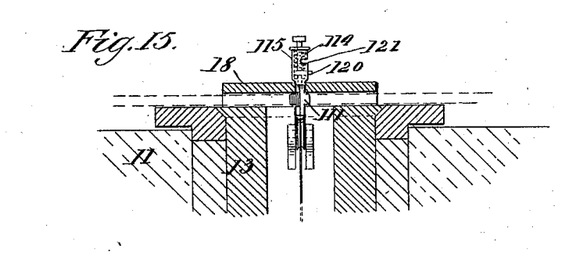

To effect the explosion of submarine mines automatically, an electrical conductor of metal may be substituted for the pencil, or should a liquid-inking pencil be employed the same may answer both purposes, and at certain points of the map—such as 117, 118, 119—there are placed insulated electrical contacts, to which, as indicated in Fig. 13, one pole of the electric battery is connected, while the other is connected through any suitable metallic part of the instrument to the pencil-slide. The electric circuit includes the detonator of the submarine mine planted in the harbor and connected electrically with the corresponding place on the map, so that when a vessel is followed by the telescope and the index mechanism correspondingly operated, as will be hereinafter described, the contact-point 113 will close the circuit of any contact that may lie in the vessel's indicated course.

The pencil or electrical contact-point can be raised to an inactive position by means of the lateral pin 120, projecting through the right-angle slot 121.

The table-map of the harbor is divided into electrically-insulated squares suitably lettered or numbered, such as 125 126, &c., Figs. 3 and 13, and on a similar vertical map placed before the gunner the training and elevation of the gun for each square is plainly marked. The corresponding squares of the two maps are connected electrically, so that as the moving pencil-point of the instrument touches any particular square or any particular part of a square the proper reading for the gun to strike that particular part of the harbor will be automatically shown the gunner. Such electrically-insulated squares, if used, are substituted for the construction of contact indicated in Fig. 13.

Second, the mechanism for operating the indicator simultaneously with the angular depression of the telescope.

Figure 8:
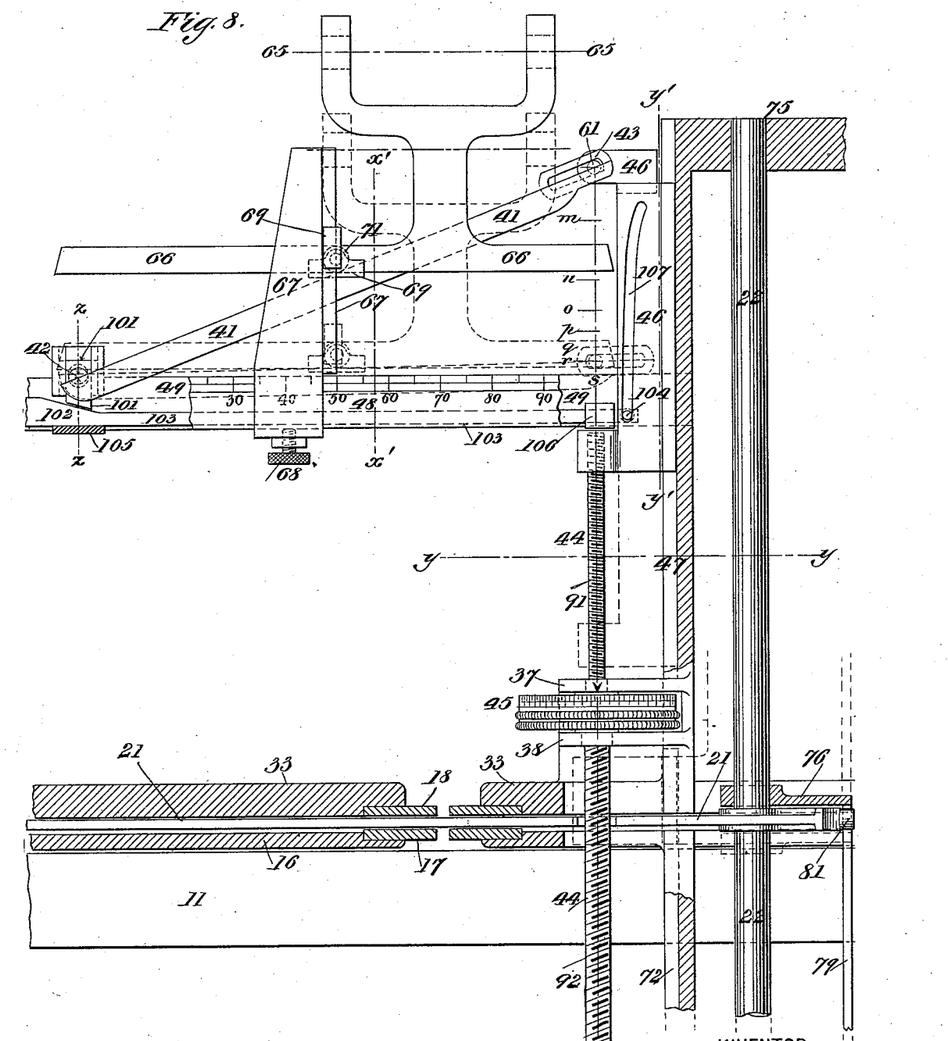
Fig. 8 is a sectional elevation on the line $xx$, Fig. 5, further enlarged.
Figure 9:
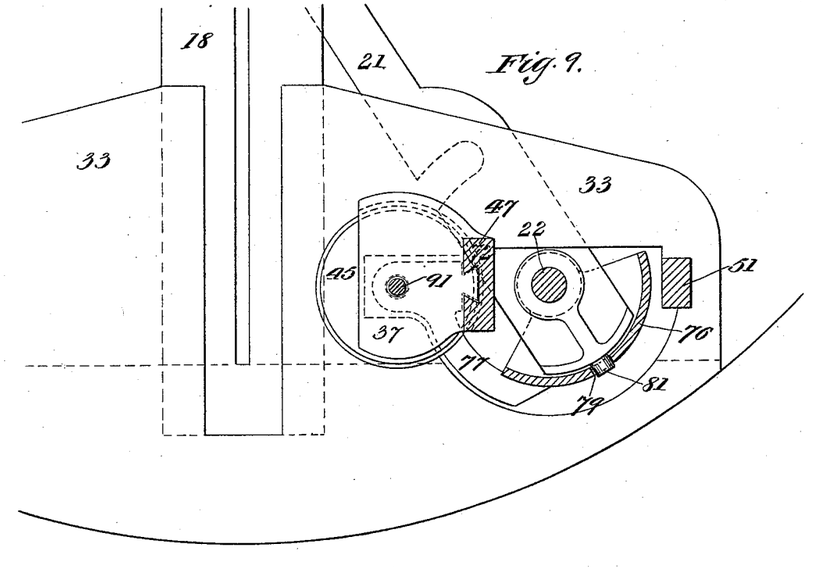
Fig. 9 represents a section through $y\ y$, Fig. 8, showing the index-cylinder and its connected parts in plan view.

The elevating apparatus for giving the telescope its depression angular movement, hereinafter fully described, and the index-cylinder 76 for operating the index-arm, are moved together by means of an elevating-screw 44, which is double, having an upper and lower screw-threaded stem 91 92. The milled screw-head 45 has a fixed plane of rotation between the bearings 37 38. According to the illustration the threads of the respective stems 91 92 have an opposite inclination, so that the aforesaid parts engaged by them are moved toward or from one another in opposite directions, and the screw-thread of the lower stem 92 has a greater pitch than that of the upper one 91 in the ratio of three to one, whereby a comparatively increased length of stroke is given to the index-cylinder 76. The axis 22, upon which the index-arm 21 moves, consists of a vertical shaft rotary in bearings 75 75, to which shaft the index-arm is attached. This shaft, together with the lower frame-bar 72, form guides for the non-rotary index-cylinder 76, which bears an arm 77, into the end of which the lower section of the screw 44 is threaded. The index-cylinder 76 is composed of a segment of a cylinder concentric with the shaft 22 and bearing an inclined slot 79, as in Figs. 6 and 9, or surface 79, as in Fig. 7. The pin or roller 81, fitting this slot or surface, has its axis radial to the shaft 22, the same being rigid with reference to the index-arm 21. As illustrated in the drawings, such pin or roller is located upon an extension of the arm itself. The inclined slot or surface 79 is helical and is constructed by points, the vertical ordinates of which correspond to the vertical movements of the eye-piece of the telescope for given ranges, multiplied according to the relative pitch of the screw-threads on the upper and lower stems of the elevating-screw, and the horizontal ordinates of which are determined by the distances moved over by the projecting pin 81 as the index-arm 21 indicates equal distances upon the scale-arm. It will be seen, therefore, that a fractional scale of distances such as indicated at Fig. 8 may be employed upon the screw-head 45 to more accurately read the range-indication.

Figure 7:
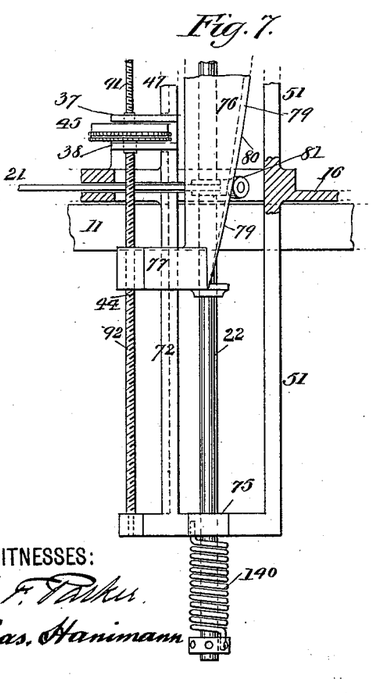
Fig. 7 is a detail view of a modification of a part of Fig. 6.

A feature of modification illustrated in Fig. 7 consists in applying a coiled spring 140 to the lower end of the shaft 22, which acts to move the index-arm 21 toward the pencil-slide 111 and bear the roller 81 against the helical surface 80, maintaining the same in contact when the cylinder 76 is moved upward.

Third, the mechanism for adjusting the relation of the depression angular movement of the telescope to the movement of the index-arm according to the altitude of the instrument.

The essential feature of the elevating apparatus consists of the elevating-arm 41, pivoted at 42, from different portions in the length of which arm the telescope is operated in variable distances of angular motion for given indicating motions of the index-arm, according to the altitude of the instrument.

The upper stem 91 of the screw 44 engages with a plate 46, which moves on the vertical guide 47, and carries a pin 61 in a line tangent to the various angles of the elevating-arm 41, with the horizontal scale-bar 48. The free end 43 of the elevating-arm is slotted in the direction of its length to receive the pin 61, and the upper edge of the arm is maintained in a plane intersecting the axis of the pin.

66 is a horizontal bearing-bar depending from the telescope-frame 24, and pivotally connected to said frame on the axis 65 to allow for the angular movement of the telescope, said bar being rigid, however, transversely.

67 is a movable tangent guide adjustable upon the scale-bar 48, its tangent line being parallel with that of the screw, and movable from a position at the zero-point of the scale opposite the pivot 42 to the extremity thereof, opposite the axis of the pin 61. The movable guide may be secured in any position by a set-screw 68.

Figure 10:
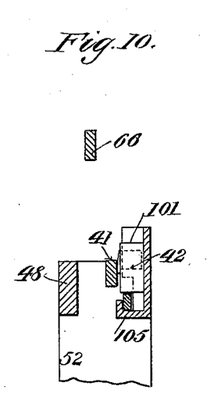
Fig. 10, a vertical cross-section at $z\ z$, Fig. 8.
Figure 11:
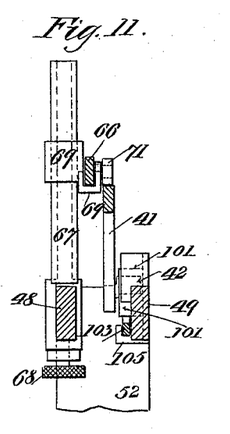
Fig. 11, a vertical cross-section at $x'\ x'$, Fig. 8.
Figure 12:
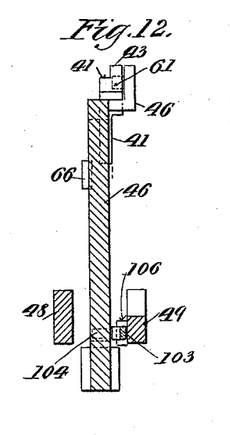
Fig. 12, a vertical cross-section at $y'\ y'$, Fig. 8.

69 is a slotted connecting-piece, one slot thereof fitting the vertical edge of the guide 67, sliding freely thereon, and the other fitting the horizontal edge of the bar 66, also sliding freely. This piece bears a roller 71 (see Figs. 5 and 11) resting on the upper edge of the elevating-arm. A connection is thus established between the horizontal bearing-bar 66 and the elevating-arm 41, whereby the movable end of the telescope-frame rests on the latter at different points of its length, according to the position of the vertical guide 67, the point of intersection between the said bar and arm, as viewed in Fig. 8, being always maintained in a vertical tangent represented by the line of said guide. The upper edge of the elevating-arm 41 is continued past the centers of the pivot 42 and the pin 61 at either end, as seen at 41 in Figs. 10 and 12, respectively, to allow the roller 71 to pass thereon to the full extent of adjustment of the guide 67 at the extremities of the scale.

The scale on the bar 48 is divided into equal parts representing in feet the altitude of the instrument. Such altitude is measured from the axis 25 of depression angular movement of the telescope to the sea-level.

It will be obvious from the foregoing that the amount of movement given to the telescope for a given movement of the elevating-screw 44 may be varied from zero to the full lineal motion of the tangent plate 46, as the roller reaches a point of contact coinciding with the axis of the pin 61, the tangents represented by the guide 67 and screw 44 coinciding.

Fourth, the apparatus for making automatic correction for the earth's curvature.

Figure 1:
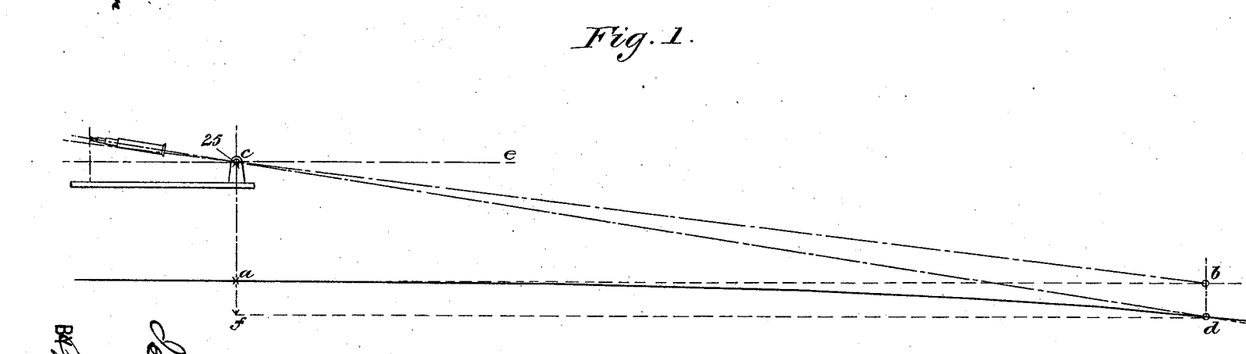
Figure 1 is a diagram illustrating the method of triangulation and of making correction for curvature of the earth's surface.
Figure 2:
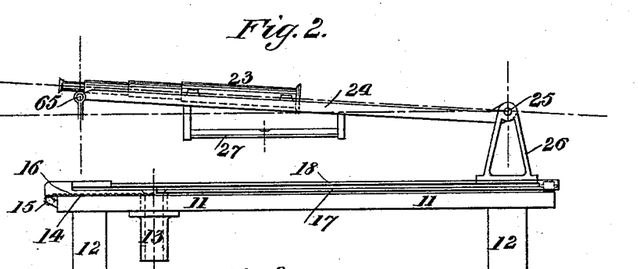
Fig. 2 is a side elevation of the instrument, showing the principal parts, and Fig. 3 a plan view drawn on the same scale as Fig. 2.

By reference to the accompanying diagram, Fig. 1, let $a\,c$ represent the vertical base-line of triangulation or altitude of the instrument, $a\,b$ a line tangent to the earth's surface, and $a\,d$ the curvature of the earth. It will be evident that in order to sight an object at $d$ equal to the range $a\,b$, as measured on the tangent-line $a\,b$ or horizontal element of triangulation, it is essential to increase the angular depression of the telescope from the angle $e\,c\,b$ to $e\,c\,d$, the correction being represented by the angle $b\,c\,d$. The true horizontal line of triangulation thereby becomes that $f\,d$ parallel to the tangent-line $a\,b$, increasing the base-line of triangulation $c\,a$ to $c\,f$. This is effected by raising the eye-piece of the telescope, or, in other words, modifying its descent for a given movement of the tangent-plate as the range increases. In order to accomplish this result, I provide for a slight automatic upward movement of the pivot 42 of the elevating-arm as the said arm descends, such movement being imparted in increasing ratio as the range increases. The pivot or fulcrum 42 is projected from a sliding block 101, having an inclined under surface. Beneath this there is a wedge 102, movable horizontally, which when moved to the right, Fig. 8, elevates the pivot 42. A rod 103 is extended from the wedge, bearing a pin 104 at its opposite extremity. The wedge and rod slide in guides 105 106. There is a curved slot 107 in the tangent-plate 46, with which the said pin 104 engages, said slot being inclined, so that when the tangent-plate is elevated to the position shown in Fig. 8 the wedge is moved to the left, the pivot 42 assuming its lowest or normal position, (indicated by the lower dotted circle,) while as the tangent-plate is lowered the wedge is moved toward the right, elevating said pivot toward the position indicated by the upper dotted circle. The lower position of the elevating-arm (indicated by dotted lines) is that assumed when the pivot 42 is thus raised and corresponds in the construction represented to a six-mile range. The extreme elevated position of the apparatus (shown by full lines in Fig. 8) corresponds to a five-hundred-yard range, the minimum distance assumed to be measured by the instrument, while the points indicated at $m\,n\,o\,p\,q\,r$, hereinafter referred to, represent the respective positions of the pin 61 of the tangent-plate at one, two, three, four, five, and six mile ranges.

If the altitude of the instrument is exactly one hundred feet there is no correction to be made, (within the six-mile limit,) since the change of position of the pivot of the elevating-arm has not increased nor diminished the length, the contact-point of the roller 71 being opposite the center of the pin 61. It will be seen, therefore, that as the altitude of the instrument or base-line of triangulation is diminished the ratio of correction is increased accordingly.

The curved slot 107 is constructed by points computed so as to give the proper amount of correction for every range, the vertical ordinates being measured to correspond to the distances of movement of the tangent-plate past the pin 104 for successive range, such as the progressive movements $m$, $n$, $o$, $p$, &c., and the horizontal ordinates being determined by trigonometrical calculation of the successive vertical movements of the pivot 42, multiplied according to the ratio of the horizontal to the vertical ordinates of the incline of the wedge 102.

The operation of the instrument is as follows: The altitude of the instrument above tide-level is first determined by means of a suitable independent instrument, and according to such altitude the movable vertical guide 67 is adjusted by the operator upon the scale 48. The telescope is then moved horizontally by means of the tangent-screw 15, or vertically by means of the tangent-screw-head 45 until the line of collimation is brought to bear upon the water-line of the vessel or other object. The indication of distance is then read directly from the scale-arm 18 and the direction noted by the horizontal angular position of the scale-arm 18 upon the plane table or map.

In order to automatically record the movements of a hostile vessels or to cause the automatic action of the mine-firing apparatus, it is simply necessary that the operator should manipulate the tangent screws aforesaid, maintaining the line of sight always upon the object.

The instrument itself may be used as a tide-gage by directing the telescope in the same vertical plane with any object whose exact range is known, then moving the screw 44 until the pencil is opposite the proper division of the scale. If the guide 67, which slides along the elevating-arm, be at the division of the scale corresponding to the elevation of the instrument above normal sea-level and there is no tide, then will the telescope be found directed on the water-line of the object. If the telescope be not found on the water-line of the object, the guide 67 is slid until it is so found, and this will show the elevation above actual sea-level.

To map a harbor a blank paper is placed upon the plane table. The point on the paper directly over the main axis of the instrument will represent the position of the same in the harbor. The telescope is then made to follow the shore-lines in view. This will give a correct outline of the desired map. Each object in the harbor—such as buoys, light-houses, &c.—is then located by simply turning the telescope upon its water-line. Small islands may be accurately traced in like manner. In recording the depth of water at different points the sounding-boat is followed through the telescope. When a sounding is made, the position of the boat is noted on the map and the depth of water recorded as soon as signaled by the sounding party to the operator.

An important advantage possessed by my improved range-finder consists in that it is a single-station instrument and requires but one operator. Moreover, the same instrument can be used for different heights above sea-level, according to locality, adapting it thereby to all places without requiring special construction.

It is to be understood that I do not limit myself to the precise construction nor proportion of the various parts of the instrument herein shown, as the same may be varied by the use of mechanical equivalents well known to the art without departing from the essential elements of the invention.

Having thus fully described my invention, what I claim, and desire to secure by Letters Patent, is—

1. The combination, with the telescope or other part of a range-finding instrument movable in known relation to the range, of a rectilinear scale-bearing arm and an index-arm pivoted at a fixed distance from the scale-arm, intersecting the scale thereon, and movable in known relation to the said movable part of the instrument.

2. The combination, with a range and position finding instrument having distinct movements in relation to the range and to the position of a distant object, of a range and position indicating mechanism composed of the following elements: a plane table, a rectilinear scale-bearing arm pivoted thereon, an index-arm pivoted to the scale-bearing arm aside from the scale-line so as to intersect the same, and mechanism for imparting the said distinct movements of the instrument to the scale-arm and the index-arm, respectively.

3. The combination, in a range and position finding instrument, of a telescope vertically movable in known relation to the range and horizontally movable in definite relation to the position of a distant object, a plane table, a rectilinear scale-bearing arm pivoted thereon movable in definite relation to the said horizontal movement of the telescope, and an index-arm pivoted to the scale-bearing arm aside from the scale-line so as to intersect the same, movable in known relation to the said vertical movement of the telescope.

4. The combination, in a range and position finding instrument, of a telescope the horizontal axis of which is removed from intersecting its vertical axis, a plane table, and a rectilinear position-indicating arm pivoted to the table, movable horizontally with the telescope, and fixed in the vertical plane including the line of collimation of the telescope.

5. The combination, in a range-finding instrument, of a telescope having depression angular motion, the horizontal axis of which is removed from intersecting its vertical axis, a rectilinear scale-bearing arm, and a pivoted index-arm intersecting the scale, movable thereon in known relation to the angle of depression of the telescope.

6. The combination, in a range-finding instrument, of a telescope having depression angular motion, a plane table, a pivoted rectilinear scale-arm supporting the telescope movable horizontally over the plane table, maintaining a parallel to a vertical plane including the line of collimation of the telescope, and an index-arm pivoted to the scale-bearing arm aside from the scale-line so as to intersect the same, movable in known relation to the angle of depression of the telescope.

7. In a range and position finding instrument, the combination of a plane table bearing a map, a rectilinear scale-arm radial to a vertical axis of rotation thereof bearing a relation to the map corresponding to the geographical position of the instrument, a depression-telescope supported upon the scale-arm having its plane of angular movement parallel thereto, and an index-arm pivoted to the scale-arm aside from the line of the scale so as to intersect the same, movable in known relation to the angle of depression of the telescope.

8. The combination, in a range-finding instrument, of a telescope having depression angular motion, an elevating-screw, a rectilinear-scale arm, a pivoted index-arm intersecting the scale to indicate the range, a nonrotary index-cylinder concentric with the axis of the index-arm moved in the length of said axis by the elevating-screw, an inclined slot or surface on the periphery of the cylinder, and a pin or projection radial to the axis of the index-arm engaging with said inclined slot or surface and bearing a fixed relation to the index-arm, whereby the same is moved simultaneously with the movement of the telescope.

9. In a range-finding instrument, the combination of a telescope having a depression angular motion, a variable base-line of triangulation determined by the altitude of the axis of angular movement of the telescope above the sea-level or other horizontal element of the triangle, a pivoted elevating-arm, an elevating-screw connected to the pivoted arm tangent to the angle of the same with a line perpendicular to the axis of the screw, a movable guide parallel with the axis of the screw adjustable at different intermediate points in the length of the elevating-arm, and a connecting-piece between the elevating-arm and the movable end of the telescope (or its frame) having a tangent line of movement determined by the position of said guide.

10. In a range-finding instrument, the combination of a telescope having a depression angular motion, a variable base-line of triangulation determined by the altitude of the axis of angular movement of the telescope above the sea-level or other horizontal element of the triangle, a pivoted elevating-arm movable in a vertical plane transverse to the vertical plane of movement of the telescope, a transverse horizontal bearing-bar connected to the movable end of the telescope, a transverse horizontal scale-bar bearing a scale representing lengths of said variable base-line, a vertical elevating-screw at the free end of the elevating-arm, tangent to the angle of the same with the scale-bar, a vertical guide also tangent to said angle, adjustable at intermediate portions of the elevating-arm upon the scale, and a connecting-piece movable upon the vertical guide for connecting the horizontal bearing-bar of the telescope with the pivoted elevating-arm at points lying in the tangent represented by the position of the vertical guide.

11. In a range-finding instrument, the combination of a telescope having depression angular motion about an axis at variable known altitude above the sea-level or other horizontal element of triangulation, an indicating-scale having given range-indications, and mechanism for determining different scale-indications for given angles of the telescope in definite relation to the variable length of the base-line of triangulation represented by the said altitude.

12. In a range-finding instrument, the combination of a telescope having depression angular motion about an axis at variable known altitude above the sea-level or other horizontal element of triangulation, an indicating-scale having given range-indications, a tangent-screw and mechanism for operating the indicator therefrom, and a pivoted elevating-arm operated by said screw by a line of movement thereof tangent to various angles of said arm with a given line, said telescope being elevated by said arm in different lines parallel to the tangent line of said screw at variable distances from the pivot of the arm.

13. In a range-finding instrument, the combination of a telescope having depression angular motion, an indicating-scale having given range-indications, a pivoted elevating-arm for the telescope having motion imparted to its free end in a fixed line tangent to its angle with a given line and in given relation to the movement of the indicator, a guide for determining a parallel tangent-line of movement of the movable end of the telescope, and mechanism, substantially as described, for moving the pivot of the elevating-arm from a normal position to increase the depression of the telescope above that given through the free end of the arm in given ratio to the range.

14. The combination of a telescope having depression angular motion, an indicating-scale having given range-indications, a pivoted elevating-arm for the telescope, a tangent-plate whereby motion is imparted to the free end of said arm in a fixed line tangent to its angle with a given line and in given relation to the movement of the indicator, a guide for determining a parallel tangent-line of movement of the movable end of the telescope, a sliding block bearing the pivot of the elevating-arm, a movable wedge acting thereon, and an inclined slot in the tangent-plate for moving the wedge, said slot having ordinates of curvature whereby to move the pivot so as to increase the depression of the telescope in definite relation to the range according to the curvature of the earth's surface.

15. The combination, in a range-finding instrument, of a depression-telescope, an elevating-screw, a rectilinear scale-arm, a pivoted index-arm movable in a horizontal plane to intersect the scale-arm, and a non-rotary index-cylinder bearing a helical groove or surface engaging with a projection of the index-arm moved vertically by said screw.

16. A range-finding instrument composed of the following elements: a depression-telescope, a rectilinear scale-arm in the same vertical plane with the telescope, a pivoted index-arm movable in a horizontal plane to intersect the scale-arm, an elevating-screw, a non-rotary index-cylinder bearing a helical groove engaging with the index-arm by vertical movement thereof imparted by said screw, a pivoted elevating-arm for the telescope, a tangent-plate connected to the free end of the elevating-arm, having a vertical line of movement also imparted by said screw, a horizontal scale-bar indicating altitudes, and a movable vertical guide thereon determining the point of contact of the movable end of the telescope with the said elevating-arm.

17. A range and position finding instrument composed of the following elements: a plane table, a depression-telescope, a rectilinear scale-arm movable horizontally over the plane table on a vertical axis and bearing the telescope in the vertical plane of its scale-line, an index-arm pivoted to the scale-arm aside from the scale-line to intersect the same by horizontal movement, an elevating-screw and a non-rotary index-cylinder vertically moved thereby bearing a helical groove engaging with the index-arm, an elevating-arm for the telescope pivoted at one end and connected at the other with the said screw, and a vertical guide for determining the point of connection of the movable end of the telescope with said elevating-arm according to the altitude of the instrument.

18. The combination, with the rectilinear scale-arm and pivoted index-arm intersecting it, of the pencil-bearing slide and pencil and a weight or equivalent for retaining the same in contact with the index-arm, as described.

19. The combination, with the plane table and the scale-arm and intersecting index-arm horizontally movable thereon to intersect at all portions of the table, of a slide upon the scale-arm controlled by the movement of the index-arm carrying an electrical contact, and of electrical contact plates or heads on the surface of the table, the said contacts being included in electrical circuits for imparting the effect of a given position of the instrument to a distant point, for the purposes described.

20. The combination of the pivoted index-arm, the non-rotary index-cylinder concentric with the axis of the arm movable in the length of such axis, bearing a helical surface engaging with a projection of the index-arm, and a spring connected to the shaft of said arm to retain the projection thereof upon the helical surface.

ISAAC N. LEWIS.

Witnesses:
WILLIAM M. WRIGHT,
ALEX. W. PERRY.